United States Patent
Martin (10) Patent No.: US 11,112,055 B2
(45) Date of Patent: Sep. 7, 2021

(54) STABILIZER AND STICK GRIP FOR ELECTRONIC DEVICES

(71) Applicant: Matthew H. Martin, Pataskala, OH (US)

(72) Inventor: Matthew H. Martin, Pataskala, OH (US)

( * ) Notice: Subject to any disclaimer, the term of this patent is extended or adjusted under 35 U.S.C. 154(b) by 0 days.

(21) Appl. No.: 16/572,297

(22) Filed: Sep. 16, 2019

(65) Prior Publication Data

US 2021/0080048 A1 Mar. 18, 2021

(51) Int. Cl.
*F16M 11/16* (2006.01)
*F16M 11/24* (2006.01)
*G03B 17/56* (2021.01)

(52) U.S. Cl.
CPC .......... *F16M 11/16* (2013.01); *F16M 11/242* (2013.01); *G03B 17/561* (2013.01); *F16M 2200/08* (2013.01)

(58) Field of Classification Search
CPC ........ F16M 11/00; F16M 11/02; F16M 11/04; F16M 11/16; F16M 11/242; F16M 2200/08; G03B 17/00; G03B 17/56; G03B 17/561

USPC ......... 396/428; 359/818; 248/187.1
See application file for complete search history.

(56) References Cited

U.S. PATENT DOCUMENTS

| | | | | |
|---|---|---|---|---|
| 2010/0021155 A1* | 1/2010 | Orzeck | ........... | G03B 17/00 396/428 |
| 2013/0233986 A1* | 9/2013 | Rasheta | ........... | G03B 17/561 248/205.1 |

FOREIGN PATENT DOCUMENTS

DE 202015007293 * 12/2015

* cited by examiner

*Primary Examiner* — Clayton E. LaBalle
*Assistant Examiner* — Fang-Chi Chang
(74) *Attorney, Agent, or Firm* — Fulwider Patton LL0

(57) ABSTRACT

A combination stabilizer and stick grip that enables a mobile phone or electronic device to be either held via a user's hand or placed on a support surface at a desired angle. The stabilizer may include a base element with a plurality of pivoting legs. It also may include an engagement element which has a surface substantially parallel to the base element along with a gripping element, a cavity element, non-slip elements on each leg, and an adjustment element. The engagement and gripping elements facilitate the secure holding of a mobile phone or other electronic device.

8 Claims, 10 Drawing Sheets

STABILIZER AND STICK GRIP FOR ELECTRONIC DEVICES

TECHNICAL FIELD

This invention relates generally to apparatus for supporting and/or stabilizing electronic devices such as mobile phones, tablet computers, cameras and the like. The invention also relates to methods for stabilizing portable electronic devices during filming.

BACKGROUND

Existing devices for holding mobile devices typically require a stabilizing element and a separate attachment to hold the mobile device. Typically, the angle of the connection between the stabilizing element and the holding device is adjustable via a locking ball-in-socket mechanism or some other type of hinge. This combination of elements creates an expensive, bulky, and unattractive device that requires extensive adjustment and doesn't fit well in a user's pocket or travel luggage.

SUMMARY OF THE INVENTION

The present invention solves these issues by creating an electronic device stabilizer that is tiltable via pivoting legs. Instead of adjusting the recording or viewing angle of a mobile device via a ball in socket mechanism, hinge, or other similar mechanism; the recording or viewing angle of the device may be adjusted by moving the legs to the appropriate angle. The current disclosure also provides a unique way to reduce the overall height of mobile device stand and holder by creating a cavity within the adjustable legs that house the adjustable element(s) of the apparatus when not in use. While the present invention may be used as a stand for viewing or recording on a mobile device, it may also be used as a stick grip, pole, or handle to securely hold a mobile device during filming or viewing. The stabilizer of the present invention can likewise include batteries (rechargeable or otherwise) that can charge an electronic device.

A stabilizer and stick grip for electronic devices is disclosed which will herein be referred to as a "stabilizer." A stabilizer may be adjusted in size and configuration to fit a variety of different electronic devices, mobile phones, tablet computers, and digital cameras.

A stabilizer can be used to mount a mobile phone. A stabilizer, in its folded position, can be used as a stick or pole to facilitate stabilized recording of video or by taking photos. It can likewise be held in either a horizontal or vertical orientation depending on the desired photo layout.

A stabilizer can also be used as a stand by unfolding the legs. In this configuration the stabilizer can be used to record video or take photos with either a front or rear facing camera. It can also be used as a viewing stand where a user can comfortably use a touch screen on a phone. In all cases the angle and orientation of the stabilizer can be adjusted to any desired angle on a flat or uneven surface. The stabilizer of the present invention can likewise be arranged in a vertical or horizontal position.

A small stabilizer can easily fit in a person's pocket when not in use by folding the legs and retracting the engagement element to its closed position. The stabilizer can include a lithium ion battery or other type of energy storage device within its body that charges an electronic device via an interface port and cord or other known method.

In a specific embodiment, a stabilizer for use with a mobile phone, electronic tablet, camera, or another portable electronic device includes an engagement element and an adjustment element. The engagement element may be configured to hold a mobile phone and includes a first member with a plurality of pivoting legs and a second element substantially parallel to the first element and configured to engage opposite ends or edges of a mobile phone. The adjustment element enables adjustment of the second element with respect to the first element to enable a secure hold on the opposite sides of a mobile phone.

DETAILED DESCRIPTION OF THE PREFERRED EMBODIMENTS

Figure 1:
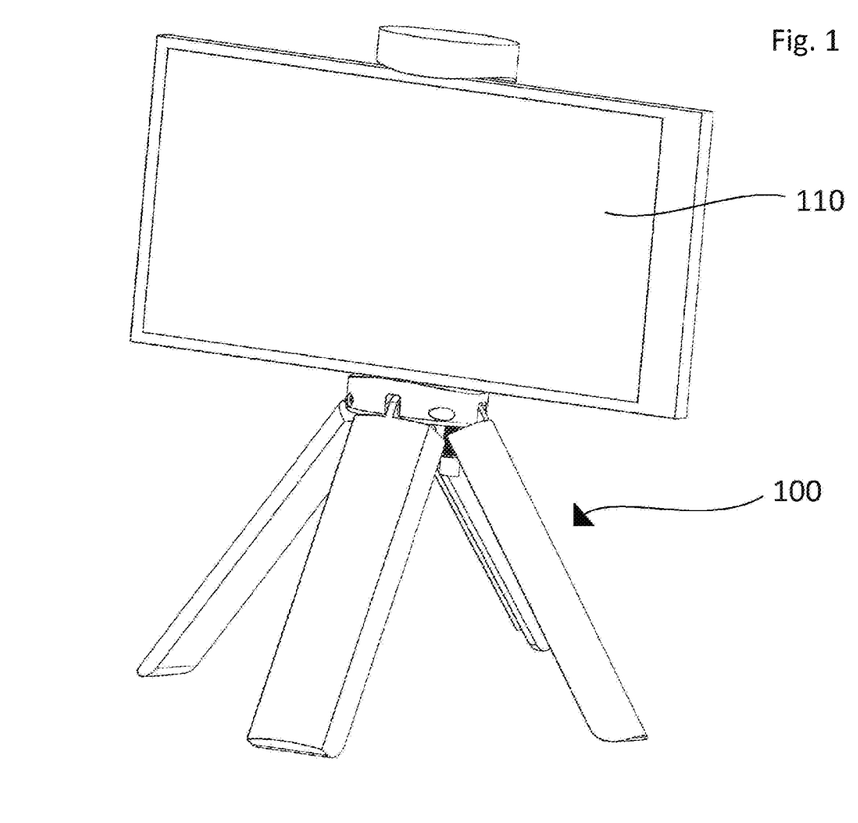
FIG. 1 is an elevated perspective view of a first preferred embodiment of the present invention.

Referring to FIG. 1, a perspective view of an embodiment of a stabilizer 100 is shown in its unfolded position with a mobile phone 110 attached.

Figure 2:
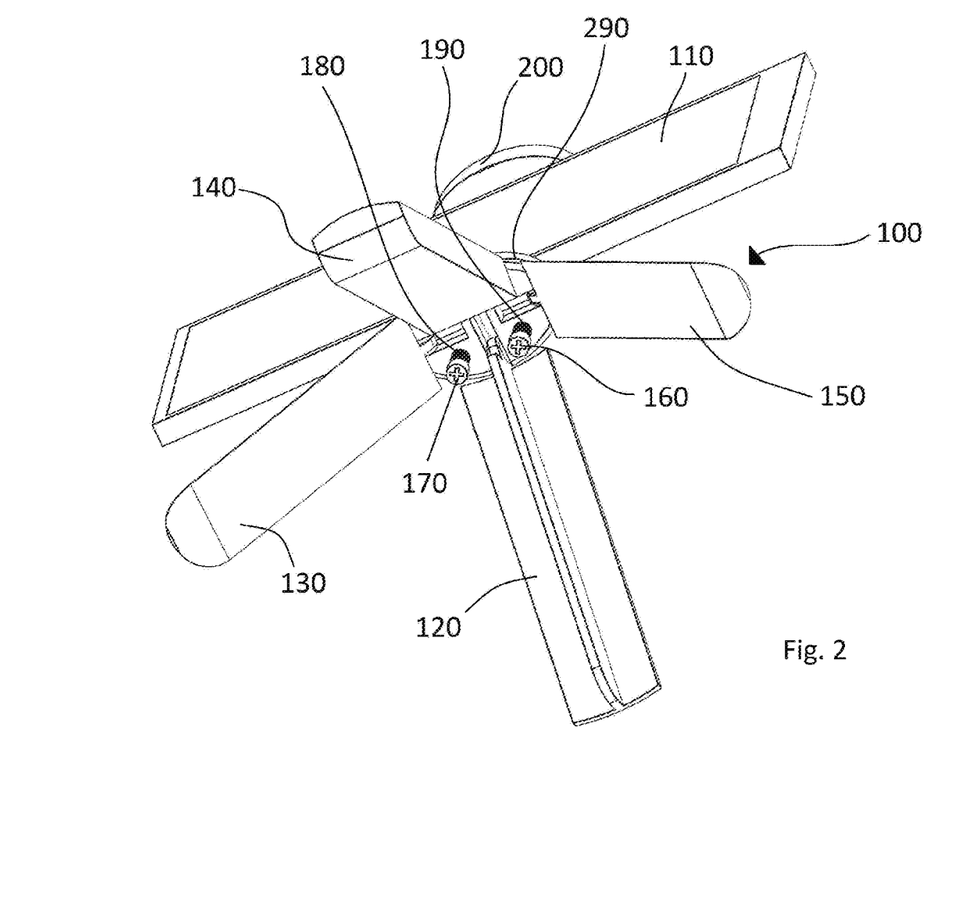
FIG. 2 is a bottom view of the first preferred embodiment of FIG. 1.

Referring to FIG. 2, a bottom view of the embodiment of a stabilizer 100 from FIG. 1 is shown in its unfolded position with a mobile phone 110 attached. Four legs 120, 130, 140, and 150 and base connector 290 make up the base element of the apparatus. A mobile phone 110 is attached to the base element via the engagement member 200 and holds the mobile phone 110 in place via an adjustment apparatus, which in this embodiment, are the springs 180 and 190. The plastic screw caps 170 and 160 hold the springs 180 and 190 in place.

Figure 3:
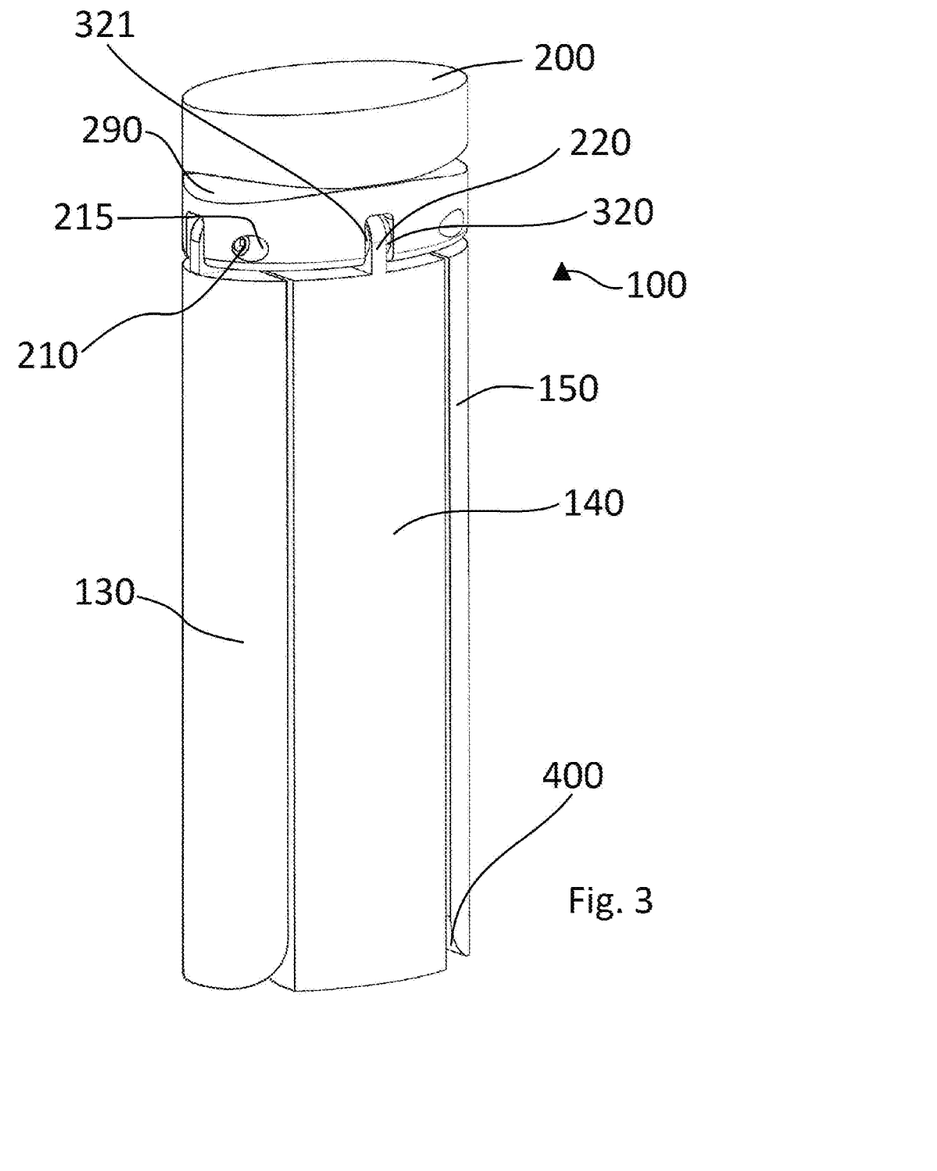
FIG. 3 is an elevated perspective view of the embodiment of FIG. 1 in a contracted configuration.

Referring to FIG. 3, a perspective view of the embodiment of a stabilizer 100 from FIG. 1 is shown in its folded and unextended position. The movable legs 130, 140, and 150 are attached to the base connector 290 via extended hinge portions 220 using mounting screws 210 that thread into threaded screw holes 215. The movable legs 130, 140, and 150 are made to be stiff, yet movable, by using retention elements, which, in this embodiment, are washers 320 and 321 which are made of material with the proper amount of friction such as rubber. Other methods for retention are equally usable such as notches which engage a spring loaded pin etc. The bottom of each leg 130, 140, 150 has a rubberized non-slip element 400 which helps prevent the stabilizer from slipping on flat or uneven surfaces.

Figure 4:
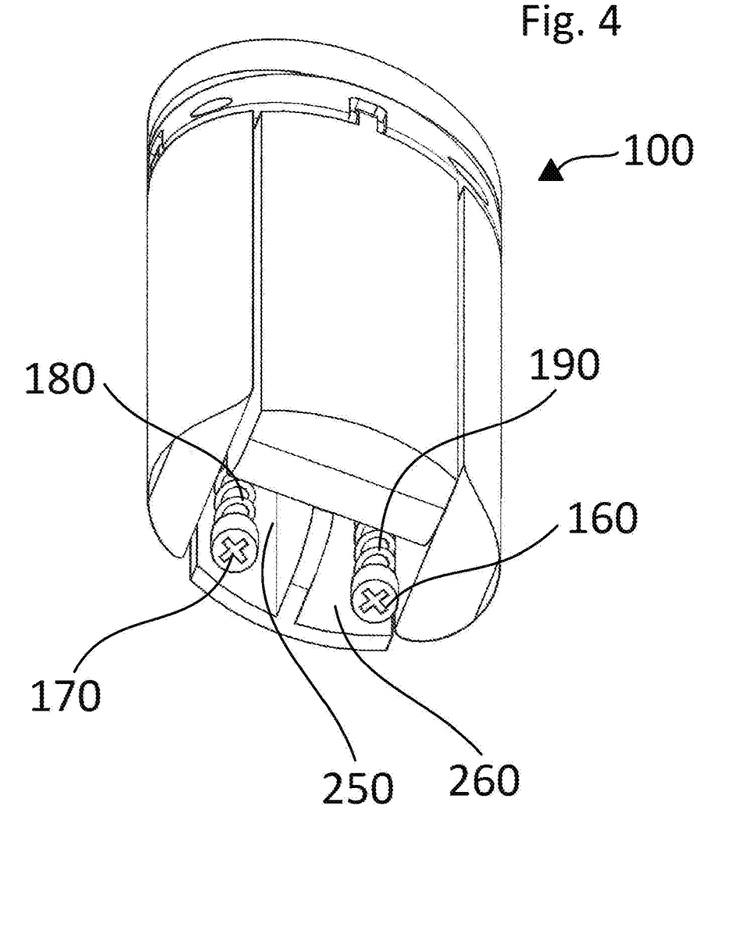
FIG. 4 is a bottom view of the embodiment of FIG. 1 in the contracted configuration.

Referring to FIG. 4, a bottom perspective view of the embodiment of a stabilizer 100 from FIG. 1 is shown in its folded and unextended position. The threaded caps 170 and 160 hold springs 180 and 190 within the cavity elements 250 and 260 which are formed in the stabilizers' 100 folded position. In this configuration, the apparatus 100, is easily storable in a users' pocket or purse.

Figure 5:
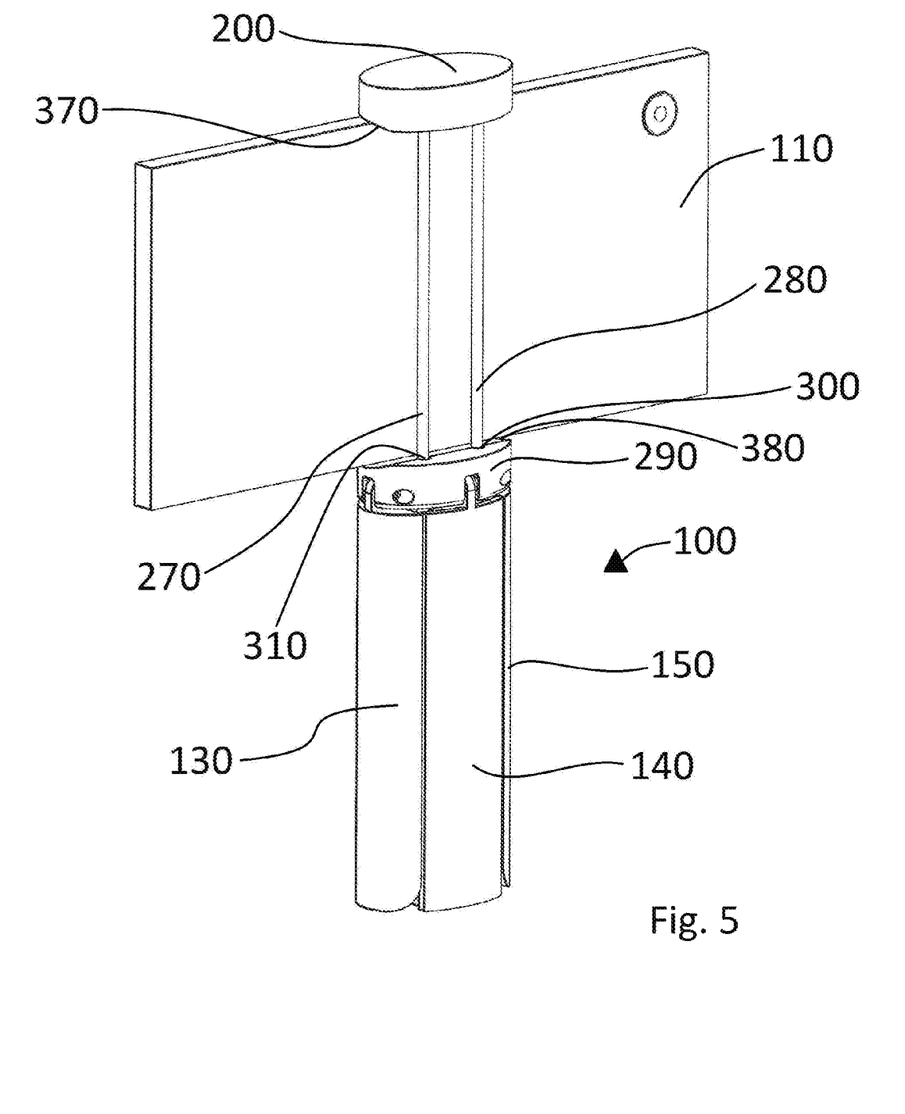
FIG. 5 is an elevated perspective view of the embodiment of FIG. 1 in the contracted configuration with an electronic device attached.

Referring to FIG. 5, a perspective view of the embodiment of a stabilizer 100 from FIG. 1 is shown in its folded and extended position with a mobile phone 110 attached. The engagement element head 200 can be moved in a substantially parallel position with respect to the base element 290 by pulling on it. The engagement element rods 270 and 280 slide through engagement holes 300 and 310 under tension from the adjustment springs housed within the base element 290. A mobile phone 110 can be held securely between the base element 290 and the engagement element head 200 under the tension of the adjustment springs which are housed within the folded base element legs 130, 140, 150, and 160. The mobile phone 110 is further secured by gripping elements 370 and 380 which, in this embodiment, are concave surfaces that are wide enough and deep enough to accommodate a variety of mobile phones 110. The engagement elements 200, 270, and 280 are likewise sized so that they can extend far enough to accommodate a variety of different sized mobile phones while providing the proper amount of tension via the adjustment elements. The adjustment elements in this embodiment are springs, although flexible bands or other resilient members can also be employed. This configuration allows the stabilizer 100 to act as a stick grip for a user to comfortably view the mobile phone 110 screen or record/take pictures with the camera of the mobile phone 110.

Figure 6:
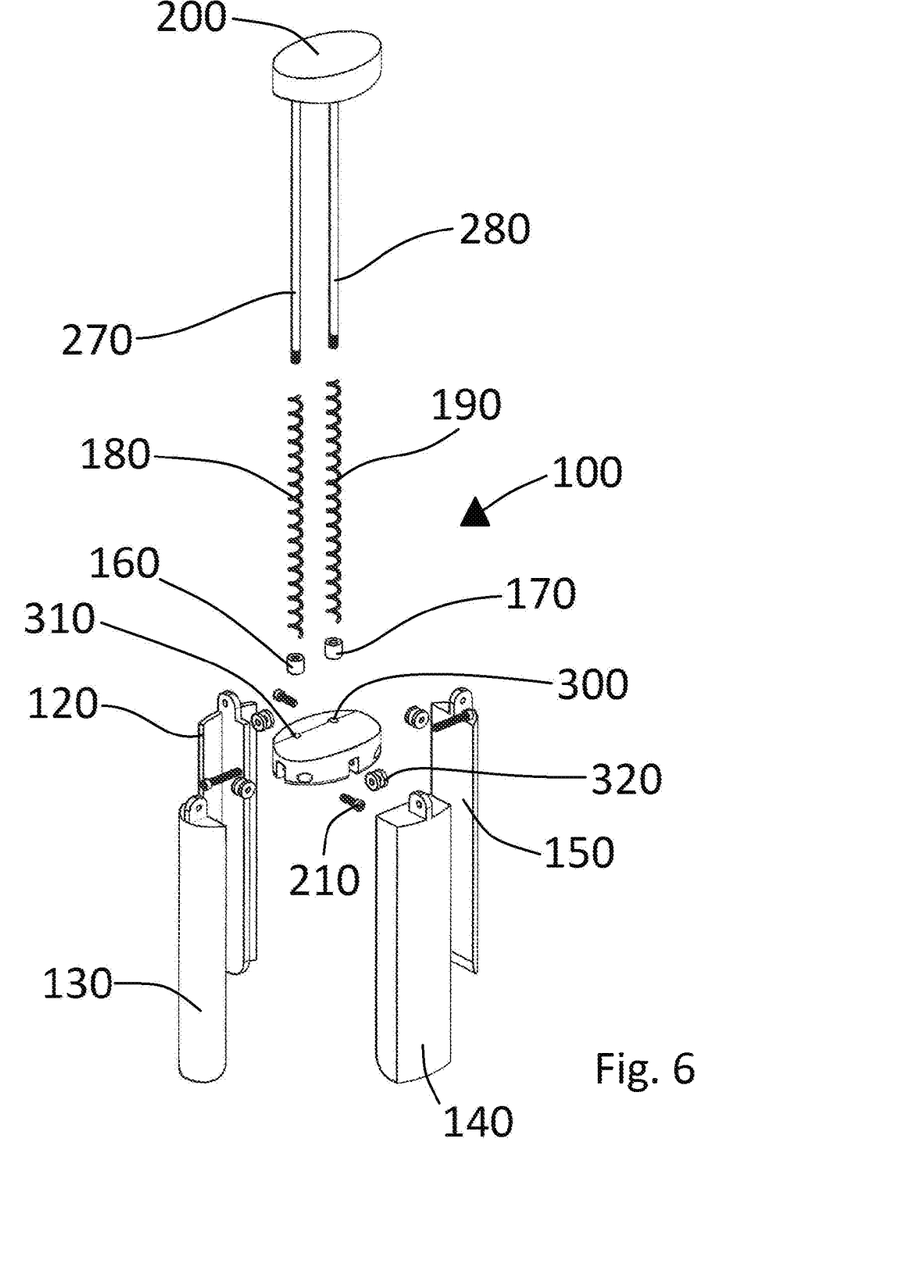
FIG. 6 is an exploded view of the embodiment of FIG. 1.

Referring to FIG. 6, an exploded view of the embodiment of a stabilizer 100 from FIG. 1 is shown. The engagement element is composed of an engagement head 200 and engagement rods 270 and 280 that fit through engagement holes 300 and 310 in the base element 290. The adjustment element is composed of springs 180 and 190 that fit around the engagement rods 270 and 280 and are held in place by the screw caps 160 and 170. The base element legs 120, 130, 140, and 150 are attached to the base element head 290 via screws 210. In this embodiment of the invention, rubber washers 320 are placed between the base element legs 120,130,140, and 150 to add friction to the pivoting movement. This configuration enables the base element legs 120, 130, 140, and 150 to be adjustable while also being stiff enough to stay in a desired angled position. Other embodiments may use different mechanisms to achieve this function.

Figure 7:
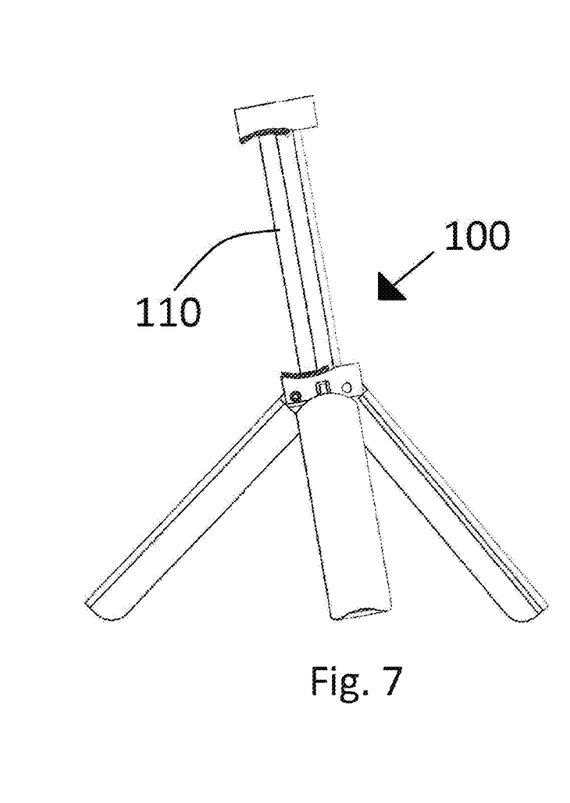
FIGS. 7 and 8 are side views of the embodiment of FIG. 1.
Figure 8:
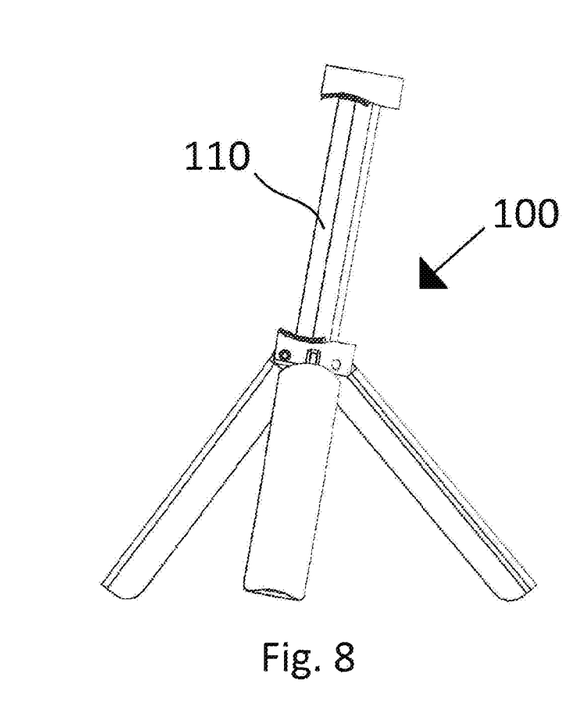

Referring to FIGS. 7 and 8, side views of the embodiment of a stabilizer 100 from FIG. 1 are shown. These views display how the stabilizer 100 angle may be adjusted so that a mobile phone 110 can be viewed or used as a recording/photographic device from a plurality of positions and on different surfaces.

Figure 9:
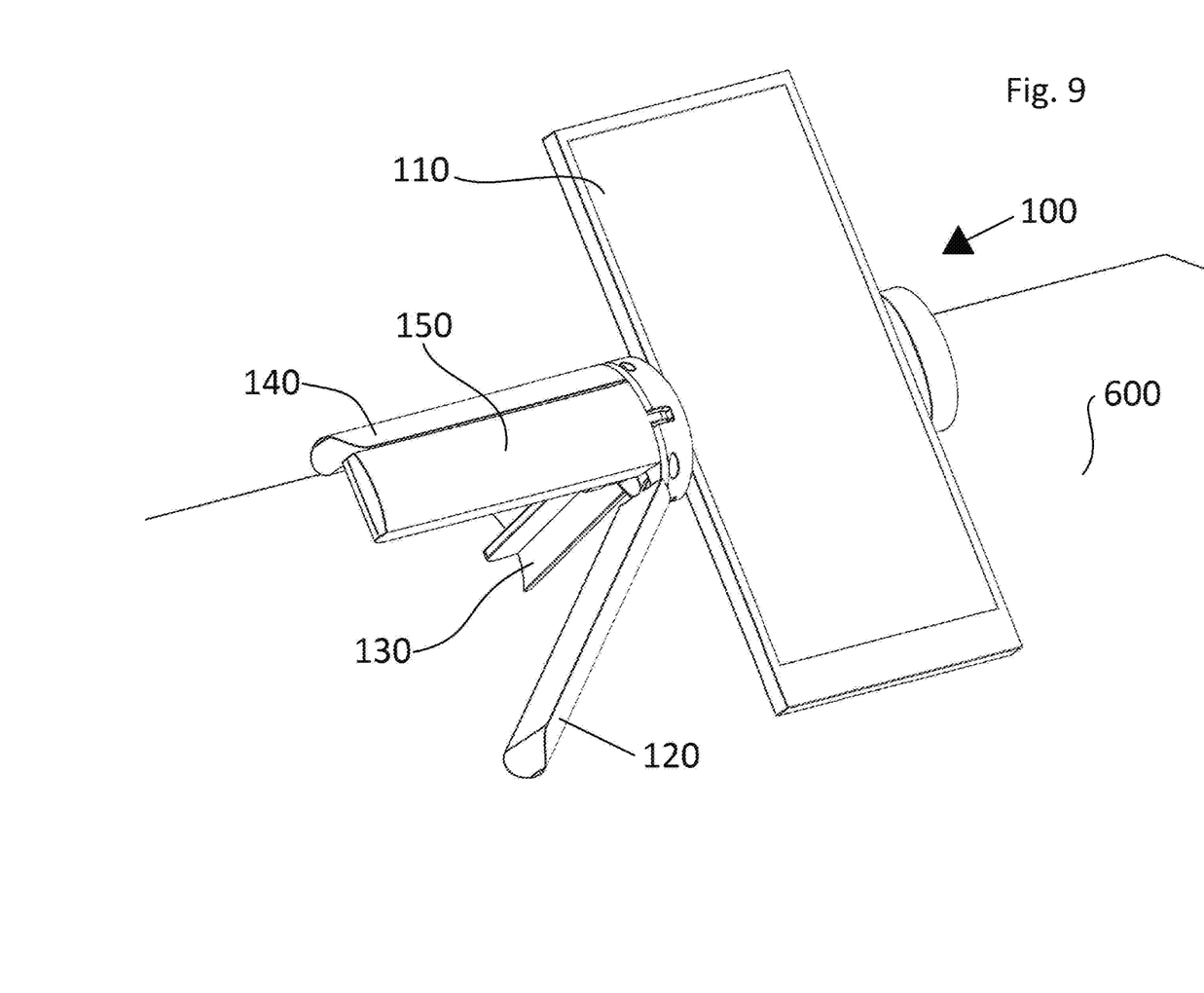
FIG. 9 is an elevated perspective view of the embodiment of FIG. 1 illustrating a vertical gripping configuration for an electronic device.

FIG. 9 is a perspective view of the embodiment of a stabilizer 100 from FIG. 1. This shows how a mobile phone 110 can be viewed in its vertical screen orientation by adjusting the base element legs 120, 130, 140, and 150 to the positions shown. This is another example of the multiple viewing configurations that are possible with this invention.

Referring to FIG. 9, a perspective view of the embodiment of a stabilizer shown in FIGS. 1 and 2 is shown in a vertical orientation viewing configuration for a mobile phone. The stabilizer 100 can be configured to allow a mobile phone 110 to be viewed in its vertical orientation on a surface 600 by adjusting legs 120, 130, 140, and 150 to the proper angles. The rear support leg 130 provides enough support for the mobile phone 110 for a user to use a touchscreen on the mobile phone 110 without causing the stabilizer 100 to fall over.

Figure 10:
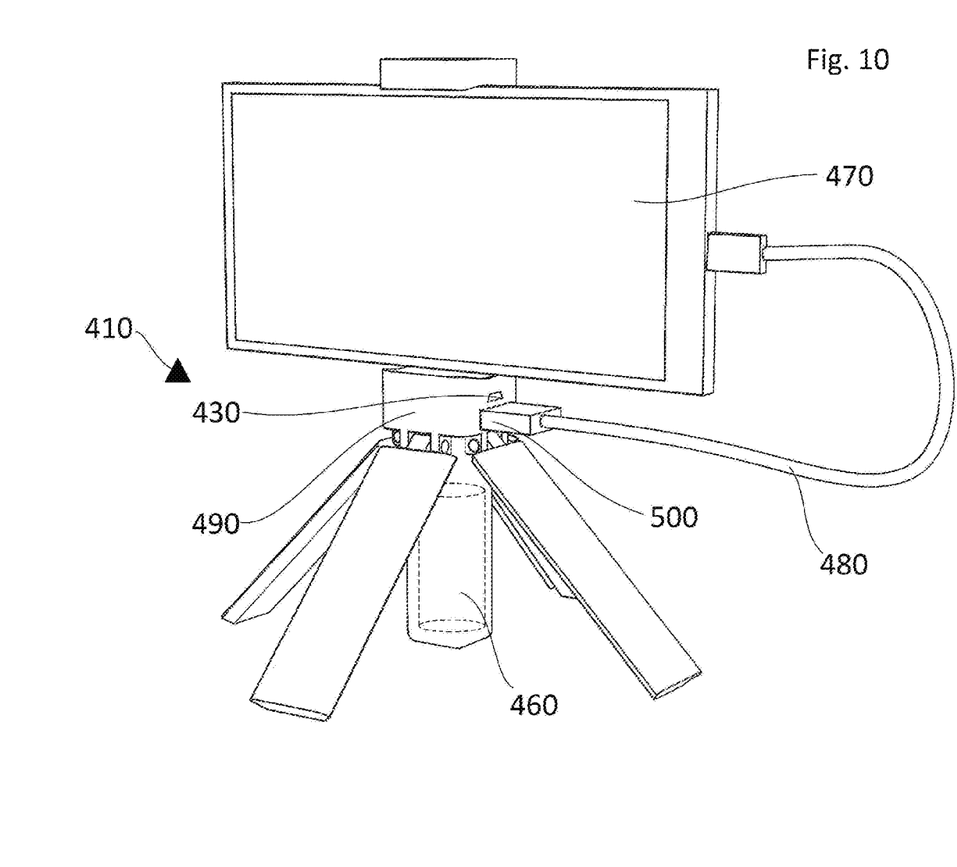
FIG. 10. is an elevated perspective view of an alternate embodiment of the present invention with an energy storage in its unfolded position.

Referring to FIG. 10, a perspective view of the embodiment of a stabilizer 410 with energy storage in its unfolded and extended position is shown. A battery 460, or other type of energy storage device, is housed within the base element 490. The battery 460 can be charged via the charging port 430 and can charge an electronic device 470 via a charging port 500 and charging cable 480. Other methods for delivering power to an electronic device 470 could include wireless induction or other known methods.

Figure 11:
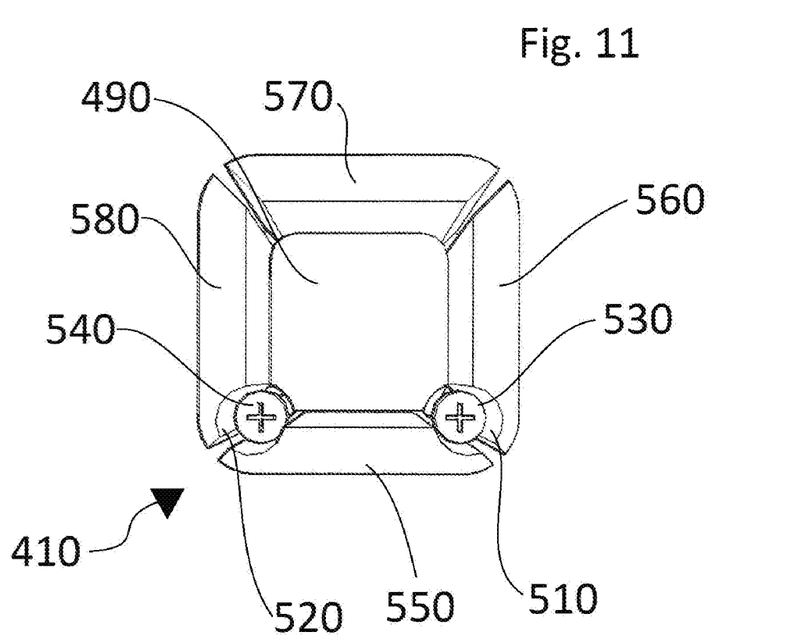
FIG. 11 is a bottom view of the embodiment of FIG. 10 in its folded and unextended position.

Referring to FIG. 11, a bottom view of the embodiment of a stabilizer 410 with energy storage in its folded and unextended position is shown. The legs 550, 560, 570, and 580 are in their folded position and create cavity elements 510 and 520 which house the engagement elements and screw caps 530 and 540.

Although the foregoing description sets forth many specifics, these should not be construed as limiting the scopes of any of the claims, but merely as providing information pertinent to some specific embodiments that may fall within the scopes of the claims. Features from different embodiments may be employed in combination. In addition, other embodiments of the disclosed subject matter may also lie within the scopes of the claims. All additions to, deletions from and modifications of the disclosed subject matter that fall within the scopes of the claims are to be embraced by the claims.

I claim:

1. A combination pedestal and handle for an electronic device, comprising:
   a plurality of legs centrally connected at respective first ends for splayed deployment in a first configuration and bunched, parallel deployment in a second configuration, the plurality of legs forming first and second cavity elements in the second configuration;
   a base disposed at said respective first ends including a first surface for receiving an edge of the electronic device, the base including first and second engagement holes;
   a reciprocating engagement member extending distally from said base including a first surface for engagement with a second edge of the electronic device, the reciprocating engagement member including first and second engagement element rods passing through said first and second engagement holes of the base, said first and second engagement element rods adapted to reside in a respective one of said first and second cavity elements when the reciprocating engagement member is retracted and the plurality of legs are disposed in the second configuration; and
   wherein the reciprocating engagement member adjusts to engage a plurality of sizes of electronic devices.

2. The combination pedestal and handle of claim 1, further comprising first and second springs biasing the first and second engagement element rods in to said first and second cavity elements.

3. The combination pedestal and handle of claim 2, further comprising a non-slip material on a lower surface of each of said plurality of legs.

4. The combination pedestal and handle of claim 3, wherein the non-slip material is disposed on a retention element.

5. The combination pedestal and handle of claim 2, further comprising a power supply storage cavity beneath the base.

6. The combination pedestal and handle of claim 5, further comprising a jack for connecting a power supply housed in the power supply storage cavity via a cable to the electronic device.

7. The combination pedestal and handle of claim 2, further comprising means for resisting movement of the legs in the splayed configuration.

8. The combination pedestal and handle of claim 1, wherein the reciprocating engagement member collapses onto the base where no electronic device is present for convenient storage.

\* \* \* \* \*